J. B. RHODES.
DUMP CAR.
APPLICATION FILED OCT. 2, 1916.
1,318,692.  Patented Oct. 14, 1919.
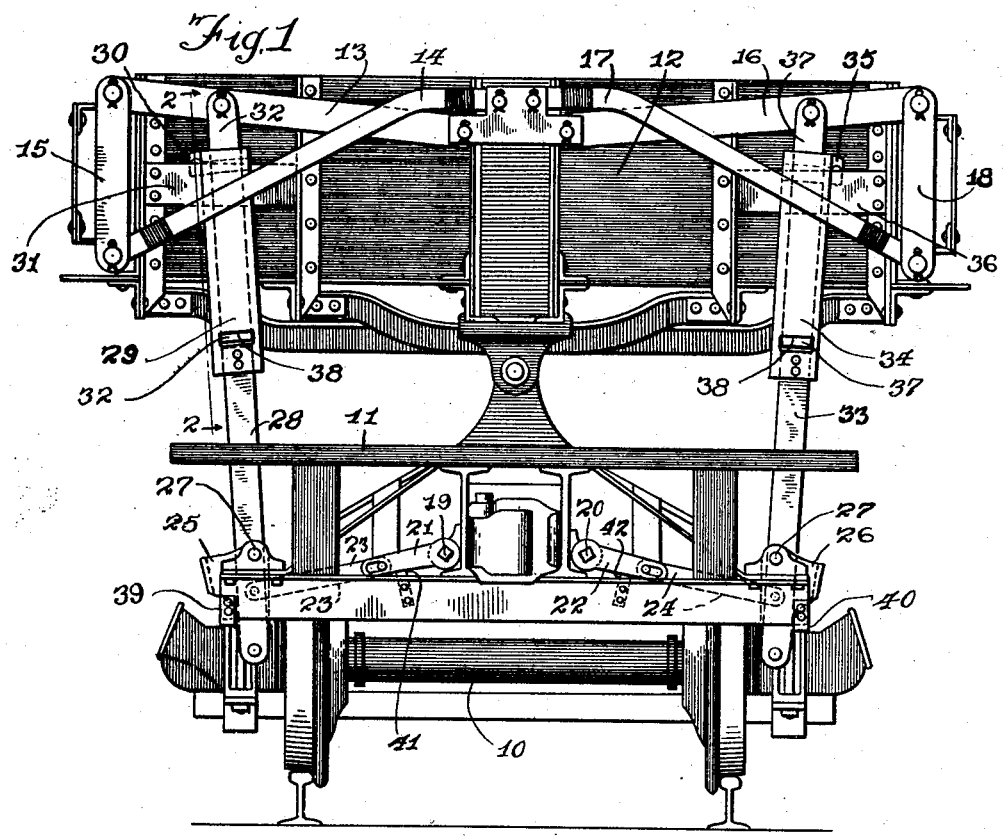
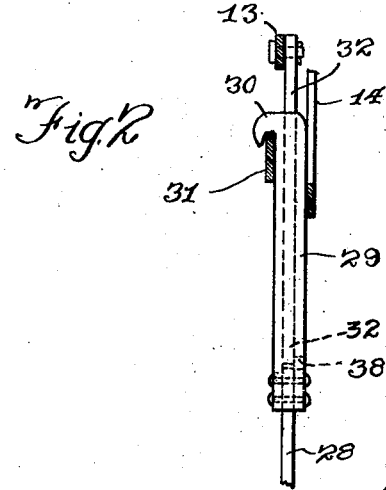

UNITED STATES PATENT OFFICE.

JAY B. RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,318,692.  Specification of Letters Patent.  Patented Oct. 14, 1919.

Application filed October 2, 1916. Serial No. 123,408.

*To all whom it may concern:*

Be it known that I, JAY B. RHODES, a citizen of the United States, and a resident of Kalamazoo, in the county of Kalamazoo and State of Michigan, have invented certain new and useful Improvements in Dump-Cars, of which the following is a specification, reference being had to the accompanying drawing.

My invention relates to dump cars, being applied in the construction shown to a dump car of the type shown in Letters Patent, No. 1,168,420, granted to me on January 18, 1916. Certain features of the construction shown herein are shown in an application by Thomas R. McKnight, Serial No. 82,391, filed March 6, 1916, now Letters Patent No. 1,259,760, dated March 19, 1918, which features in and of themselves form no part of my invention. It is one of the objects of my invention to provide a new and improved form and arrangement of means for operating the side doors of a dump car of this type, and for holding the car-body in normal position. Another of my objects is to provide mechanism of this type which shall not be likely to get out of order in use. A further object of my invention is to provide improved means for holding the car-body in normal horizontal position, being so constructed and arranged that it shall continue to be effective regardless of the severe strains put upon it in use, and which shall not be subject to distortion or disarrangement by reason of stretching in use. It is also an object of my invention to provide sundry improvements as hereinafter pointed out. The preferred means by which I have accomplished my several objects are illustrated in the drawings and are hereinafter specifically described. That which I believe to be new and desire to cover by this application is set forth in the claims.

In the drawings:

Figure 1 is an end view of a car embodying my improved construction; and

Fig. 2 is an enlarged detail, being substantially a section taken on line 2—2 of Fig. 1.

Referring to the drawings in which corresponding parts are indicated by the same reference characters,—

10 indicates a truck connected by any suitable means with the longitudinally-extending frame 11 of the car upon which is pivotally mounted a car-body 12. Links 13—14 are pivotally connected at their inner ends with the end of the car-body at about its middle point, being pivotally connected at their outer ends with a side gate 15 of any suitable type adapted to be held by the links 13—14 in position for snugly closing the side of the car when the bed 12 is in normal horizontal position. Links 16—17 are pivotally connected at their inner ends with the end of the car-body 12 and are pivotally connected at their outer ends with a side gate 18 at the side of the car opposite to that closed by the gate 15. Rock-shafts 19—20 are revolubly mounted upon the frame 11, being provided with laterally-extending arms 21—22, respectively, the outer ends of which are pivotally connected by means of links 23—24 with heavy links or brackets 25—26 which are pivotally mounted upon the framework 11 upon longitudinally-extending axes 27. Upon a rotation of the rock-shaft 19 in clockwise direction in Fig. 1 the arm 21 and the link 23 are buckled relative to each other causing the bracket 25 to revolve about its axis 27 in counterclockwise direction in said figure. In like manner, when the rock-shaft 20 is rotated in counterclockwise direction in Fig. 1, the bracket 26 is rotated in clockwise direction about its pivot 27. The parts so far referred to are all of the form and construction illustrated in the McKnight application above referred to, and it is accordingly believed to be unnecessary to further describe them herein.

The free end of the bracket 25 is pivotally connected with a link 28 provided at its upper end with a flat tubular extension 29 rigidly connected thereto. The extension member 29 is provided at its upper end with rigid means such as a hook 30 adapted to engage a transversely-extending bar 31 carried by the car-body 12. A bar 32 pivotally connected at its upper end to the laterally-extending link 13 is slidably mounted in the tubular bar-member 29 of the link 28, having its lower end in the normal position of the parts extending substantially into contact with the upper end of the link 28.

At the opposite side of the car the mechanism last above described is duplicated, comprising a link 33, a tubular extension 34 provided with a hook 35 adapted to engage a laterally-extending bar 36, and a bar 37 pivotally connected with the laterally-extending link 16.

When it is desired to dump the car to the right in Fig. 1, the rock-shaft 19 is given a rotation in clockwise direction in said figure, serving to draw the link 23 and the bracket 25 inward. At the same time in proper timed relation thereto, power is applied for raising the left-hand side of the car-body. As the car-body is tipped toward the right, the hooked link member 29 and the link member 28 rigidly attached thereto are moved upward, serving to swing the bracket 25 upward about its pivot 27, the hook 30 remaining in engagement with the bar 31, and the door 15 remaining in operative closing position. As the car-body tips toward the right in said figure, the bar 37 descends very slightly until it comes in contact with the upper end of the link 33. Upon a further downward movement of that side of the car-body, the gate 18 is maintained in elevated position through the medium of the links 33, 34 and 37, the transversely-extending bar 36 being free to move downward out of engagement with the hook 35. When the car is brought back to normal position, the bar 37 having a long bearing in the tubular link member 34 serves to guide the hook 35 again into engagement with the laterally-extending bar 36. If for any reason the side gate 18 is prevented from seating itself properly upon the bed 12 as said bed resumes its normal horizontal position, the hook 35 is nevertheless brought into snug engagement with the bar 36, the upward play of the gate 18 relative to the bed 12 being permitted through the sliding engagement between the bar 37 and the tubular link member 34. The bed is thus permitted to return to position and is locked in normal position regardless of the position of the side gate relative to the car-body. The tubular members 29—34 are provided with openings 38 at their lower ends to permit the escape of any foreign matter which may work its way between the slide-bars and the tubular members.

As is best shown in Fig. 1, the hooks 30—35 are adapted to engage the laterally-extending bars 31—36 at the outer side edges only of said hooks, as is shown by the dotted lines defining the angle of the hook. The upward pressure of the plates or bars 31—36 upon the hooks is accordingly applied to the hooks at their outer edges, tending to turn the links 32 outward about their pivotal connections with the bars 13—16, this in turn having a tendency to turn the brackets 25—26 into past-center locking position rather than to turn them out of locking position.

By reason of the relative arrangement of the laterally-extending links 13—14, the vertically-extending link comprising the members 28, 29 and 32, and the laterally-extending bar 31 at one side of the car, and of the corresponding parts at the opposite side of the car, the gates 15—18 are braced against movement longitudinally of the car-body. The car is thus rendered very strong to resist the shocks to which it is subjected in ordinary train use.

Stop devices 39—40 are provided at opposite sides of the frame 11 for limiting the outward movement of the links or brackets 25—26, respectively, and stop devices 41—42 of any suitable type are provided for limiting the downward movement of the arms 21—22, respectively. By these means the past-center locking through the medium of the system of links and levers is strengthened and made more certain.

While I have described my car as having gates at both sides so as to be capable of being dumped at either side, it will be understood that I do not wish to be limited to this construction, except as hereinafter specifically claimed.

What I claim as my invention and desire to secure by Letters Patent, is

1. In a dump car, the combination of a car-body adapted to tilt toward one side to discharge its load, a gate for closing that side of the car, a link having hooked engagement with said car-body adapted to hold the car-body against tilting toward the opposite side, and means operatively connected with said gate having sliding engagement with said hooked link and serving to support the gate in operative closing position but permitting the car-body to be tilted out of engagement therewith.

2. In a dump car, the combination of a car-body adapted to be tilted toward one side to discharge its load, a gate for closing that side of the car, and means for supporting said gate in operative closing position, comprising a transversely-extending link pivotally mounted on the car-body and having pivotal connection with said gate, a vertically-extending link having hooked engagement with said car-body adapted to hold the car-body against tilting toward the opposite side, and a bar pivotally connected with said transversely-extending link and having sliding engagement with said hooked link.

3. In a dump car, the combination of a car-body adapted to be tilted toward one side to discharge its load, a gate for closing that side of the car, and means for supporting said gate in operative closing position, comprising a transversely-extending link pivotally mounted on the car-body and having pivotal connection with said gate, a tubular link having hooked engagement with said car-body adapted to hold the car-body against tilting toward the opposite side, and a bar slidably mounted in said tubular link and pivotally connected at its upper end with said transversely-extending link.

4. In a dump car, the combination of a car-body adapted to be tilted toward one side to discharge its load, a gate for closing that side of the car, and means for supporting said gate in operative closing position, comprising a transversely-extending link pivotally mounted on the car-body and having pivotal connection with said gate, a tubular link member having hooked engagement with said car-body, means connected with said tubular link member comprising a bar fixed in the lower end of said tubular link member adapted to hold said car-body against tilting toward the opposite side, and a second bar slidably mounted in said tubular link member and pivotally connected at its upper end with said transversely-extending link, being adapted by its contact with said first-named bar to hold said gate in raised position when the car-body is tilted toward that side and being adapted to permit the gate to rise freely independently of the car-body.

5. A dump car comprising a truck, a pivotally mounted car bed, a side gate, swinging supporting means for said side gate, endwise movable extensibly connected members for holding up said side gate, one of said members being connected with the side gate and the other with the truck frame, and rigid means carried by the latter member and engaging the car bed for preventing tilting thereof in one direction independently of endwise movement of the latter member.

6. A dump car comprising a truck, a pivotally mounted car bed, a side gate, swinging supporting means for said side gate, endwise movable extensibly connected members for holding up said side gate, one of said members being connected with the side gate and the other with the truck frame, and means carried by the latter member and detachably engaging the car bed for preventing tilting thereof in one direction independently of endwise movement of the latter member.

7. A dump car comprising a truck, a pivotally mounted car bed, a side gate, swinging supporting means for said side gate, endwise movable extensibly connected members for holding up said side gate, one of said members being connected with the side gate and the other with the truck frame, and a hook carried by the latter member and engaging the car bed for preventing tilting thereof in one direction independently of endwise movement of the latter member.

8. In a dump car, the combination of a frame, a car-body pivotally mounted on said frame and adapted to be tilted toward one side to discharge its load, a gate for closing that side of the car, means for supporting said gate from said frame in operative closing position adapted to permit the car-body to be tilted out of engagement with the gate, a link mounted on said frame and having hooked engagement with said car-body adapted to hold the car-body against tilting toward the opposite side, and guiding means comprising a bar having sliding engagement with said link adapted to hold said link in proper position relative to said car-body.

9. In a dump car, the combination of a frame, a car-body pivotally mounted on said frame and adapted to be tilted toward one side to discharge its load, a gate for closing that side of the car, means for supporting said gate from said frame in operative closing position adapted to permit the car-body to be tilted out of engagement with the gate, a link pivotally mounted on said frame and adapted to be raised and lowered relative thereto, a hook on the upper end of said link the outer portion of which hook engages the car-body for holding it against tilting toward the opposite side, and guiding means comprising a bar having sliding engagement with said link adapted to hold said link in proper position relative to said car-body.

10. In a dump car, the combination of a frame, a car-body pivotally mounted on said frame and adapted to be tilted toward one side to discharge its load, a gate for closing that side of the car, means for supporting said gate from said frame in operative closing position adapted to permit the car-body to be tilted out of engagement with the gate, two pivotally-connected links one of which is pivotally mounted on said frame, a hook on the upper end of the other link, the outer portion of which engages said car-body, said links being adapted to be straightened relative to each other for permitting the car-body to be tilted toward the opposite side and being adapted alternatively to be buckled relative to each other and moved into a past-center locking position for holding the car-body against tilting toward the opposite side, and guiding means comprising a bar having sliding engagement with said hooked link adapted to hold said link in proper position relative to said car-body.

11. A dump car comprising a truck, a pivotally mounted car bed, a side gate, swinging supporting means for said side gate, endwise movable telescopically connected members for holding up said side gate, one of said member being connected with the side gate and the other with the truck frame, and rigid means carried by the latter member and engaging the car bed for preventing tilting thereof in one direction independently of endwise movement of the latter member.

12. A dump car comprising a truck, a pivotally mounted car bed, a side gate, swinging supporting means for said side gate, endwise movable telescopically connected members for holding up said side gate, one of said members being connected with the side gate and the other with the truck frame, and means carried by the latter member and detachably engaging the car bed for preventing tilting thereof in one direction independently of endwise movement of the latter member.

13. A dump car comprising a truck, a pivotally mounted car bed, a side gate, swinging supporting means for said side gate, endwise movable telescopically connected members for holding up said side gate, one of said members being connected with the side gate and the other with the truck frame, and a hook carried by the latter member and engaging the car bed for preventing tilting thereof in one direction independently of endwise movement of the latter member.

14. In a dump car, the combination of a car-body adapted to be tilted to discharge its load, links pivotally connected with said car-body and extending laterally relative thereto, gates pivotally mounted on said links at opposite sides of the car, two other links one at each side of the car having hooked engagement with said car-body for holding it against tilting, and bars pivotally connected with said first-named links respectively at opposite sides of the car having sliding engagement with said hooked links respectively.

JAY B. RHODES.

Copies of this patent may be obtained for five cents each, by addressing the "Commissioner of Patents, Washington, D. C."